US012683047B2

(12) United States Patent (10) Patent No.: US 12,683,047 B2
Akiyama et al. (45) Date of Patent: Jul. 14, 2026

(54) MULTILAYER CERAMIC COMPONENT

(71) Applicant: Panasonic Intellectual Property Management Co., Ltd., Osaka (JP)

(72) Inventors: Yuto Akiyama, Hokkaido (JP); Sayaka Watanabe, Hokkaido (JP); Yuji Yamagishi, Hokkaido (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 427 days.

(21) Appl. No.: 18/550,067

(22) PCT Filed: Mar. 9, 2022

(86) PCT No.: PCT/JP2022/010365
§ 371 (c)(1),
(2) Date: Sep. 11, 2023

(87) PCT Pub. No.: WO2022/196501
PCT Pub. Date: Sep. 22, 2022

(65) Prior Publication Data
US 2024/0161950 A1 May 16, 2024

(30) Foreign Application Priority Data
Mar. 16, 2021 (JP) ................................. 2021-041966

(51) Int. Cl.
*H01C 7/112* (2006.01)
*C04B 35/453* (2006.01)
(Continued)

(52) U.S. Cl.
CPC ............ *H01C 7/112* (2013.01); *C04B 35/453* (2013.01); *C04B 35/64* (2013.01); *H01C 1/148* (2013.01); *H01C 7/18* (2013.01)

(58) Field of Classification Search
CPC .......... H01C 7/112; H01C 1/148; H01C 7/18; C04B 35/453; C04B 35/64
See application file for complete search history.

(56) References Cited

U.S. PATENT DOCUMENTS

2007/0091532 A1 4/2007 Yamauchi et al.
2019/0333700 A1* 10/2019 Cho ........................ H01G 4/30
(Continued)

FOREIGN PATENT DOCUMENTS

JP H02-033908 A 2/1990
JP H09-275046 A 10/1997
(Continued)

OTHER PUBLICATIONS

WO 2017/002495 machine translation. (Year: 2017).*
(Continued)

*Primary Examiner* — Kyung S Lee
(74) *Attorney, Agent, or Firm* — Rimon P.C.

(57) ABSTRACT

A multilayer ceramic component according to the present disclosure includes a sintered body, a plurality of internal electrodes, and a side surface electrode. The side surface electrode includes: a primary electrode layer containing silver as a main component thereof; and a plating layer covering the primary electrode layer at least partially. The primary electrode layer includes a first terminal portion provided for the side surface of the sintered body and a second terminal portion. The second terminal portion extends, in a second direction, from at least one of a pair of end portions of the first terminal portion in a third direction and is provided for at least one of a pair of principal surfaces. An interposed portion is formed by allowing a part of the plating layer to enter a region where a tip of the second terminal portion and the sintered body are separate from each other.

10 Claims, 6 Drawing Sheets

(51) Int. Cl.
| | | |
|---|---|---|
| *C04B 35/64* | (2006.01) | |
| *H01C 1/148* | (2006.01) | |
| *H01C 7/18* | (2006.01) | |

(56)  References Cited

U.S. PATENT DOCUMENTS

| | | | |
|---|---|---|---|
| 2020/0043655 A1* | 2/2020 | Cha | H01G 4/012 |
| 2020/0194150 A1* | 6/2020 | Uchida | H01C 7/12 |
| 2022/0285095 A1* | 9/2022 | Iguchi | H01G 4/2325 |
| 2024/0161949 A1* | 5/2024 | Nagatomo | H01C 1/148 |

FOREIGN PATENT DOCUMENTS

| | | | |
|---|---|---|---|
| JP | 2005-223280 A | 8/2005 | |
| JP | 2007-115931 A | 5/2007 | |
| JP | 2010-109238 A | 5/2010 | |
| JP | 2020-096075 A | 6/2020 | |
| WO | 2017/002495 A1 | 1/2017 | |

OTHER PUBLICATIONS

International Search Report dated May 31, 2022 issued in International Patent Application No. PCT/JP2022/010365, with English translation.

\* cited by examiner

*FIG. 4*

MULTILAYER CERAMIC COMPONENT

CROSS-REFERENCE OF RELATED APPLICATIONS

This application is the U.S. National Phase under 35 U.S.C. § 371 of International Patent Application No. PCT/JP2022/010365, filed on Mar. 9, 2022, which in turn claims the benefit of Japanese Patent Application No. 2021-041966, filed on Mar. 16, 2021, the entire disclosures of which Applications are incorporated by reference herein.

TECHNICAL FIELD

The present disclosure relates to a multilayer ceramic component for use in various types of electronic devices.

BACKGROUND ART

Recently, as various types of consumer electronic appliances and onboard electronic devices have been further downsized, varistors, forming part of those appliances and devices, have been increasingly required to have an even smaller size. In addition, the higher the operating frequency of a given device is, the more likely the performance of the device will be affected by its capacitance. That is why there has been an increasing demand for a varistor that not only ensures a predetermined varistor voltage but also has smaller capacitance with significantly reduced variation. Meanwhile, a structure including a pair of varistors in a single element has been proposed in the known art to reduce the difference in capacitance between the two varistors used as the pair. Such a structure is disclosed by, for example, Patent Document 1, which is one of the documents related to the varistor.

In the known varistor, the smaller its overall size is, the shorter the distance between its external electrodes is. In addition, if a member underlying the external electrode is made of a metallic material containing silver as its main component, residual stress, if any, in the external electrode would cause a part of the external electrode to peel off, thus possibly exposing the silver in the underlying member. In that case, the silver thus exposed would increase the chances of causing migration, which is a problem with the known varistor.

CITATION LIST

Patent Literature

Patent Literature 1: JP 2007-115931 A

SUMMARY OF INVENTION

It is therefore an object of the present disclosure to provide a multilayer ceramic component that reduces the chances of causing migration.

A multilayer ceramic component according to an aspect of the present disclosure includes a sintered body, a plurality of internal electrodes, and a side surface electrode. The sintered body has a pair of end surfaces facing each other in a first direction, a pair of side surfaces facing each other in a second direction, and a pair of principal surfaces facing each other in a third direction. The sintered body has a shape of a rectangular parallelepiped, of which the longitudinal axis is aligned with the first direction. The plurality of internal electrodes are arranged inside the sintered body. The side surface electrode is provided for at least one of the pair of side surfaces of the sintered body and electrically connected to at least one of the plurality of internal electrodes. The side surface electrode includes: a primary electrode layer containing silver as a main component thereof; and a plating layer formed to cover the primary electrode layer at least partially. The primary electrode layer includes: a first terminal portion provided for the at least one side surface of the sintered body; and a second terminal portion extending, in the second direction, from at least one of a pair of end portions of the first terminal portion in the third direction and provided for at least one of the pair of principal surfaces. A tip of the second terminal portion and the sintered body are separate from each other in a region. The multilayer ceramic component further includes an interposed portion as a part of the plating layer that has entered the region where the tip of the second terminal portion and the sintered body are separate from each other.

BRIEF DESCRIPTION OF DRAWINGS

FIG. 4 is a perspective view illustrating the appearance of the multilayer ceramic component;

DESCRIPTION OF EMBODIMENTS

A multilayer ceramic component according to an exemplary embodiment of the present disclosure will be described with reference to FIGS. 1-6. In the following description, the multilayer ceramic component is supposed to be a multilayer varistor as an example.

Figure 1:
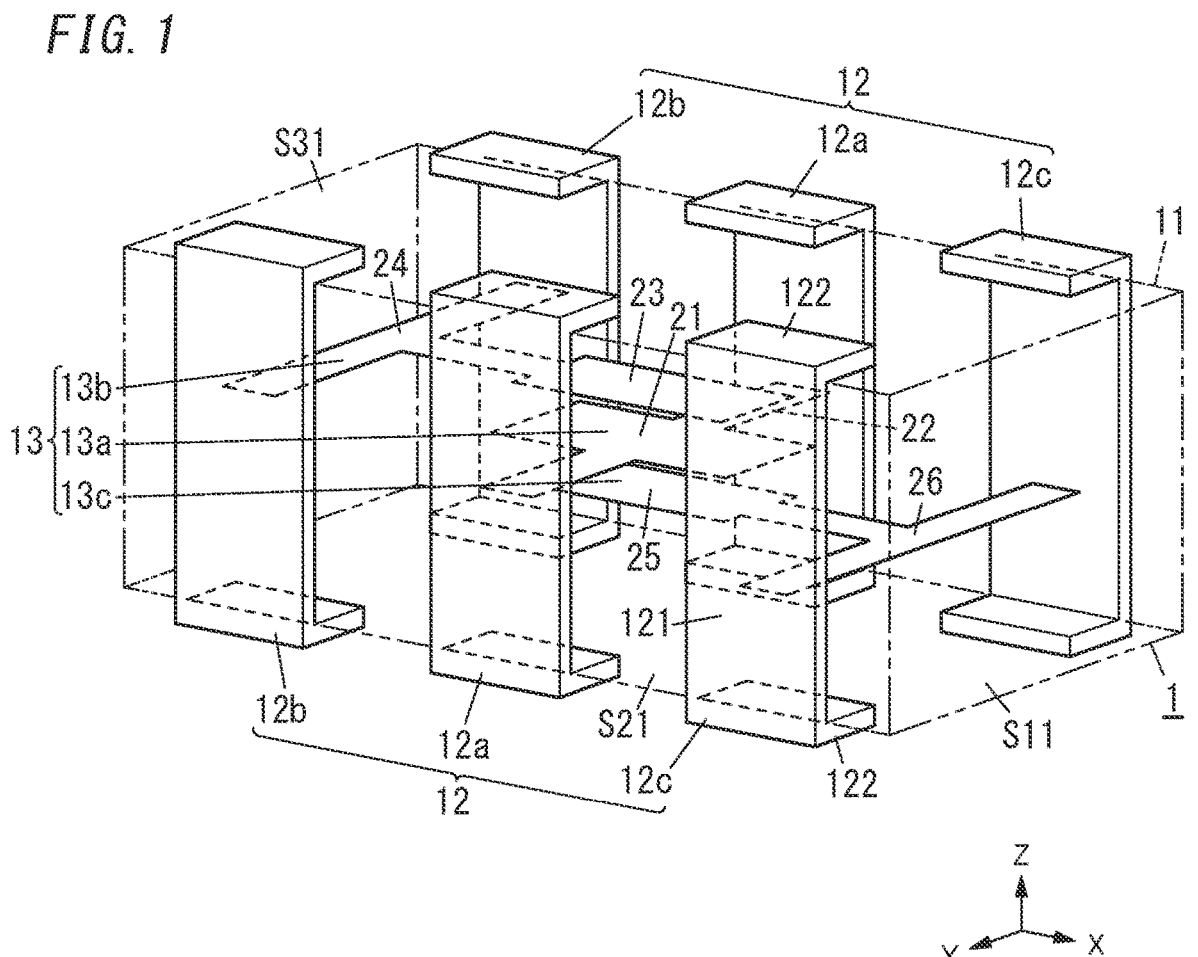
FIG. 1 is a see-through perspective view of a multilayer ceramic component according to an exemplary embodiment of the present disclosure.
Figure 2:
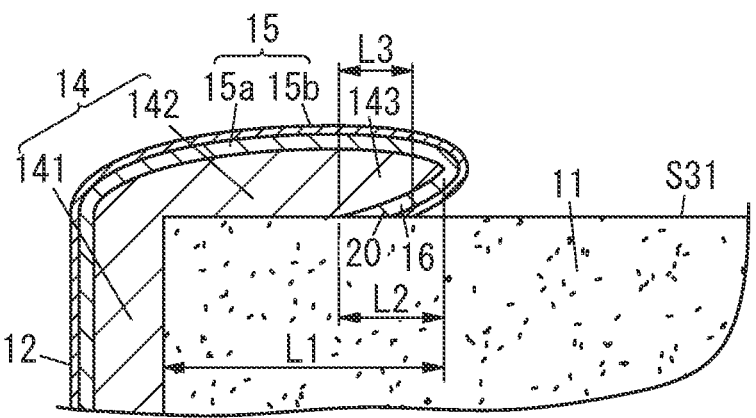
FIG. 2 is a cross-sectional view of a side surface electrode that forms part of the multilayer ceramic component.

FIG. 1 is a see-through perspective view of a multilayer varistor 1 according to an exemplary embodiment of the present disclosure. FIG. 2 is a cross-sectional view of a side surface electrode that forms part of the multilayer varistor 1. The multilayer varistor 1 includes a sintered body 11, a plurality of internal electrodes 13 arranged inside the sintered body 11, and a plurality of external electrodes (first to third external electrodes 12a-12c) respectively provided on the surfaces of the sintered body 11 and electrically connected to the plurality of internal electrodes 13. The sintered body 11 of the multilayer varistor 1 except the external electrodes has the shape of a rectangular parallelepiped having a length of 1.6 mm, a width of 0.8 mm, and a height of 0.6 mm Although the sintered body 11 is illustrated as a rectangular parallelepiped in FIG. 3 and other perspective views illustrating its appearance, the corner portions of the sintered body 11 may be chamfered and rounded as appropriate.

In the following description, the X-axis direction parallel to the longitudinal axis of the sintered body 11 is herein defined as a rightward/leftward direction, the Y-axis direction is herein defined as a forward/backward direction (depth direction), and the Z-axis direction is herein defined as an upward/downward direction as shown in FIG. 1. Furthermore, the positive side of the X-axis direction is herein defined as the right side, the positive side of the Y-axis direction is herein defined as the front side, and the positive side of the Z-axis direction is herein defined as the upside. Note that these directions are only examples and should not be construed as limiting the direction in which the multilayer varistor 1 is supposed to be used. Note that arrows indicating these directions are shown on the drawings for illustrative purposes only and are insubstantial ones.

Figure 3:
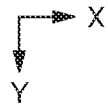
FIG. 3 is a see-through top view of the multilayer ceramic component.
Figure 4:
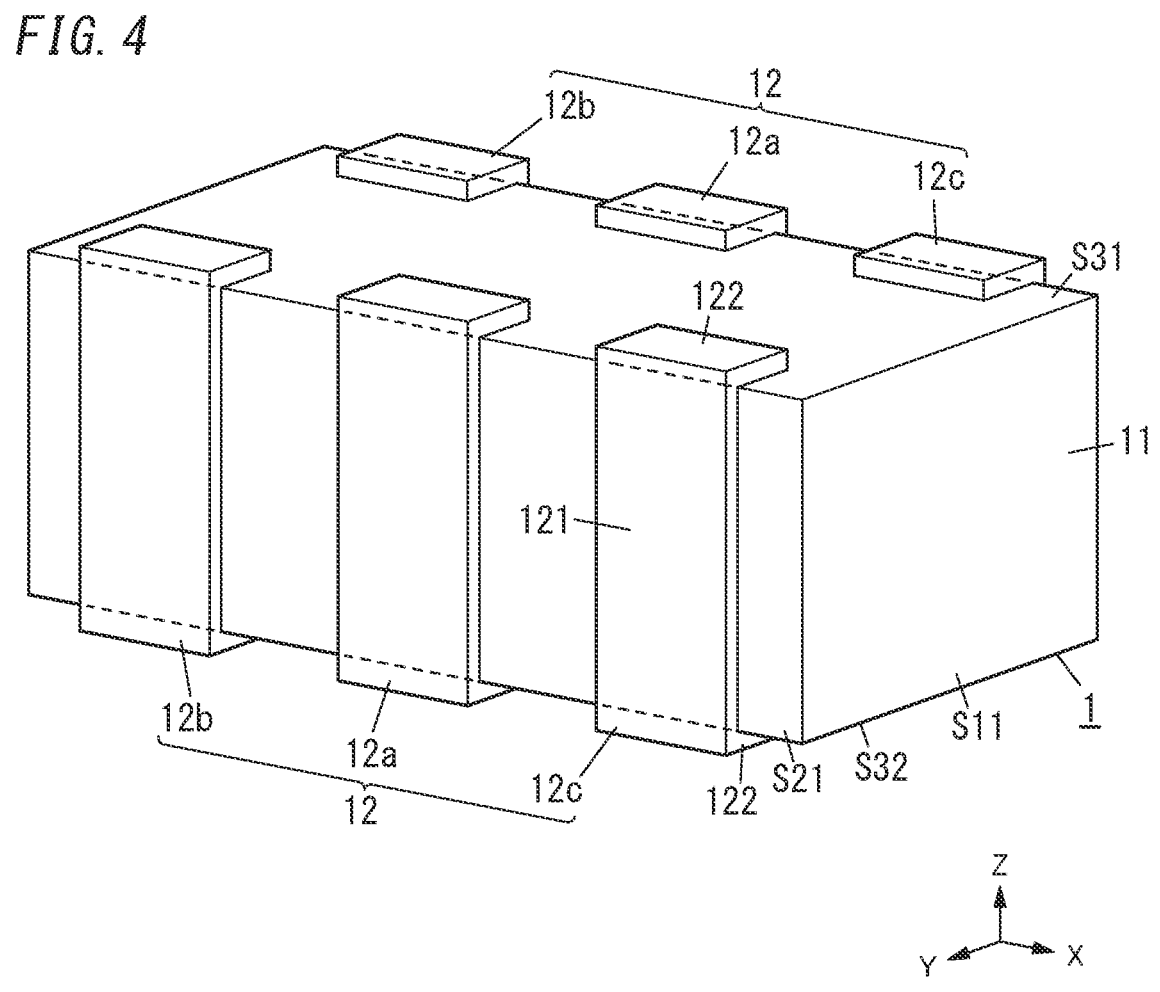

As shown in FIGS. 1, 3, and 4, the sintered body 11 has a pair of end surfaces facing each other in a first direction; a pair of side surfaces facing each other in a second direction; and a pair of principal surfaces facing each other in a third direction. Out of the pair of end surfaces, the right end surface will be hereinafter referred to as a "first end surface S11" and the left end surface as a "second end surface S12." Out of the pair of side surfaces, the front side surface will be hereinafter referred to as a "first side surface S21" and the rear side surface as a "second side surface S22." Out of the pair of principal surfaces, the upper principal surface will be hereinafter referred to as a "first principal surface S31" and the lower principal surface as a "second principal surface S32." The sintered body 11 has a multilayer structure in which a plurality of layers are stacked one on top of another in the third direction and is formed in the shape of a rectangular parallelepiped, of which the longitudinal axis is aligned with the first direction.

The sintered body 11 is made of a semiconductor ceramic component with a nonlinear resistance characteristic. This sintered body 11 may contain, for example, ZnO as a main component thereof and either $Bi_2O_3$, $Co_2O_3$, $MnO_2$, $Sb_2O_3$, or any other suitable compound or $Pr_6O_{11}$, $Co_2O_3$, $CaCO_3$, $Cr_2O_3$ or any other suitable compound as a sub-component thereof. Alternatively, the sintered body 11 may also contain ZnO as a main component thereof and either at least one compound selected from the group consisting of $Bi_2O_3$, $Co_2O_3$, $MnO_2$, and $Sb_2O_3$ or at least one compound selected from the group consisting of $Pr_6O_{11}$, $Co_2O_3$, $CaCO_3$, and $Cr_2O_3$ as a sub-component thereof. For example, the sintered body 11 may have a multilayer structure in which multiple layers, each containing ZnO as a main component, are stacked one on top of another. The sintered body 11 may be formed by causing ZnO to be sintered and causing other sub-components to deposit on the grain boundary thereof. In this sintered body 11, the internal electrodes 13 are formed between the multiple layers stacked.

Each of the two longer side surfaces (namely, the first side surface S21 and the second side surface S22) of the sintered body 11 is provided with a side surface electrode 12 at the middle of the longer side surface. This side surface electrode 12 serves as a first external electrode 12a. The first external electrode 12a is electrically connected to a first internal electrode 13a arranged inside the sintered body 11. Each of the two longer side surfaces (namely, the first side surface S21 and the second side surface S22) of the sintered body 11 is further provided, as other side surface electrodes 12, a second external electrode 12b and a third external electrode 12c, which are arranged on both sides of the first external electrode 12a. Inside the sintered body 11, further provided are a second internal electrode 13b which is electrically connected to the second external electrodes 12b and a third internal electrode 13c which is electrically connected to the third external electrodes 12c.

As shown in FIGS. 1 and 3, the first internal electrode 13a includes a first facing portion 21 and at least one first extended portion 22. In top view, the first facing portion 21 has a rectangular shape and partially overlaps in the third direction with second internal electrode 13b and the third internal electrode 13c. The first extended portion 22 has a narrower width as measured in the first direction than the first facing portion 21. The first extended portion 22 protrudes in the second direction from the first facing portion 21. In this embodiment, two first extended portions 22 protrude forward and backward, respectively, from the first facing portion 21. One of the two first extended portions 22 is electrically connected to the first external electrode 12a provided for the first side surface S21. The other of the two first extended portions 22 is electrically connected to the first external electrode 12a provided for the second side surface S22.

As shown in FIGS. 1 and 3, the second internal electrode 13b includes a second facing portion 23 and a second extended portion 24. The second facing portion 23 faces, in the third direction, the first facing portion 21 via some of the multiple layers of the sintered body 11. In top view, the second facing portion 23 has a rectangular shape. The second facing portion 23 has a narrower width as measured in the first direction than the first facing portion 21. The second facing portion 23 has a narrower width as measured in the second direction than the first facing portion 21. The second extended portion 24 protrudes in the first direction from the second facing portion 23. In this embodiment, the second extended portion 24 includes: a first linking portion 24b that links together the two second external electrodes 12b; and a first protruding portion 24a protruding in the first direction from the second facing portion 23 and connected to the first linking portion 24b as shown in FIG. 3. In this embodiment, the first protruding portion 24a protrudes to the left, for example, from the second facing portion 23. The first linking portion 24b protrudes forward and backward from a left end portion of the first protruding portion 24a to link together the two second external electrodes 12b.

As shown in FIGS. 1 and 3, the third internal electrode 13c includes a third facing portion 25 and a third extended portion 26. The third facing portion 25 faces, in the third direction, the first facing portion 21 via some of the multiple layers of the sintered body 11. In top view, the third facing portion 25 has a rectangular shape. The third facing portion 25 has a narrower width as measured in the first direction than the first facing portion 21. The third facing portion 25 has a narrower width as measured in the second direction than the first facing portion 21. The third extended portion 26 protrudes in the first direction from the third facing portion 25. In this embodiment, the third extended portion 26 protrudes in the opposite direction from the second extended portion 24, e.g., to the right. The third extended portion 26 includes: a second linking portion 26b that links together the two third external electrodes 12c; and a second protruding portion 26a protruding in the first direction from the third facing portion 25 and connected to the second linking portion 26b as shown in FIG. 3. In this embodiment, the second protruding portion 26a protrudes to the right, for example, from the third facing portion 25. The second linking portion 26b protrudes forward and backward from a right end portion of the second protruding portion 26a to link together the two third external electrodes 12c.

The first internal electrode 13a is arranged to be sandwiched, in the stacking direction of the sintered body 11, between the second internal electrode 13b and the third internal electrode 13c and the first facing portion 21 is arranged to face not only the second facing portion 23 but also the third facing portion 25, thus forming a varistor region. In other words, the multilayer varistor 1 includes two varistors (hereinafter referred to as a "first varistor" and a "second varistor," respectively). The first varistor is formed between the first external electrodes 12*a* and the second external electrode 12*b* (i.e., between the first internal electrode 13*a* and the second internal electrode 13*b*). The second varistor is formed between the first external electrodes 12*a* and the third external electrodes 12*c* (i.e., between the first internal electrode 13*a* and the third internal electrode 13*c*).

A single first external electrode 12*a*, a single second external electrode 12*b*, and a single third external electrode 12*c* are provided for each of the two longer side surfaces (namely, the first side surface S21 and the second side surface S22) of the sintered body 11 as viewed in the stacking direction. In other words, in this embodiment, each of the two longer side surfaces (namely, the first side surface S21 and the second side surface S22) of the sintered body 11 is provided with the single first external electrode 12*a*, the single second external electrode 12*b*, and the single third external electrode 12*c* as side surface electrodes 12. Note that each of these side surface electrodes 12 may be provided for at least one of the pair of side surfaces (namely, the first side surface S21 and the second side surface S22) of the sintered body 11 and may be electrically connected to at least one of the plurality of internal electrodes 13.

As shown in FIG. 2, each of the first external electrodes 12*a*, second external electrodes 12*b*, and third external electrodes 12*c* serving as the side surface electrodes 12 includes a primary electrode layer 14 and a plating electrode 15. The primary electrode layer 14 is formed by applying a paste containing silver as a main component and a glass frit as an additional component onto the sintered body 11 and baking the paste. The plating electrode 15 serves as a plating layer formed on the surface of the primary electrode layer 14. In other words, each of the side surface electrodes 12 includes the primary electrode layer 14 containing silver as a main component thereof and a plating layer formed to cover the primary electrode layer 14 at least partially (specifically, the plating electrode 15 formed out of the plating layer). In the following description, the plating layer formed on the surface of the primary electrode layer 14 will be hereinafter sometimes referred to as the "plating electrode 15." The plating electrode 15 includes: a primary plating electrode 15*a* of nickel, for example, formed on the primary electrode layer 14; and a secondary plating electrode 15*b* of tin, for example, formed on the primary plating electrode 15*a*. That is to say, in this embodiment, a material for the plating layer (plating electrode 15) formed on the primary electrode layer 14 includes at least one of nickel or tin.

Meanwhile, the primary electrode layer 14 includes a first terminal portion 141 and a second terminal portion 142. The first terminal portion 141 is provided for a side surface (which is either the first side surface S21 or the second side surface S22) of the sintered body 11. The second terminal portion 142 includes a pair of terminals extending in the second direction from a pair of end portions of the first terminal portion 141 in the third direction. The pair of terminals are provided for the pair of principal surfaces (namely, the first principal surface S31 and the second principal surface S32), respectively, thus allowing the multilayer varistor 1 to be mounted onto a board with either the first principal surface S31 or the second principal surface S32 arranged to face the board. In this embodiment, the second terminal portion 142 includes the pair of terminals provided for the pair of principal surfaces, respectively. Alternatively, the second terminal portion 142 may include only one terminal provided for one of the pair of principal surfaces. That is to say, the primary electrode layer 14 may include the second terminal portion 142 extending in the second direction from at least one of the pair of end portions of the first terminal portion 141 in the third direction and provided for at least one of the pair of principal surfaces.

In this embodiment, on each of the upper surface (first principal surface S31) and lower surface (second principal surface S32) of the sintered body 11, the primary electrode layer 14 has an average thickness of about 4 μm, the nickel layer (primary plating electrode 15*a*) has a thickness of about 2 μm, and the tin layer (secondary plating electrode 15*b*) has a thickness of about 3 μm.

The primary electrode layer 14 (refer to FIG. 2) forming part of the side surface electrodes 12 is formed on the side surface (which is either the first side surface S21 or the second side surface S22) of the sintered body 11 by, for example, transferring an electrode paste that fills a groove. The primary electrode layer 14 is formed to partially cover the upper surface and lower surface of the sintered body 11. That is to say, the primary electrode layer 14 that forms part of the side surface electrodes 12 includes the first terminal portion 141 that partially covers the side surface (which is either the first side surface S21 or the second side surface S22) of the sintered body 11 and the two second terminal portions 142 extending in the second direction from the upper end portion and lower end portion, respectively, of the first terminal portion 141. The two second terminal portions 142 are provided to partially cover the upper surface (first principal surface S31) and the lower surface (second principal surface S32), respectively, of the sintered body 11.

In this embodiment, the second terminal portion 142 is provided for each of the upper surface (first principal surface S31) and the lower surface (second principal surface S32) of the sintered body 11 such that an air gap 20 is left between a tip 143 of the second terminal portion 142 of the primary electrode layer 14 and the sintered body 11. In this embodiment, the primary electrode layer 14 is formed by a groove printing process in which the sintered body 11 is pushed into an intaglio where grooves are filled with an electrode paste containing a glass frit. This allows the multilayer varistor 1 according to this embodiment to reduce the average thickness of the primary electrode layer 14 compared to a printing process in which the primary electrode layer 14 is formed by pressing the sintered body 11 against a relief where an electrode paste has been applied. In addition, the second terminal portion 142 is formed on the principal surface by letting the electrode paste that fills the grooves creep up. Thus, the second terminal portion 142 is formed to have a smaller average thickness than the first terminal portion 141 formed on the side surface.

In this embodiment, the primary electrode layer 14 is formed to have a smaller average thickness than in a situation where the primary electrode layer 14 is formed by the relief printing process. This reduces the amount of the glass frit in the electrode paste, thus causing a decrease in the adhesive strength of the primary electrode layer 14. Consequently, as the primary electrode layer 14 shrinks during a cooling process after the sintered body 11 has been formed by sintering, stress produced by the shrinkage causes the tip 143 of the second terminal portion 142 to peel off the surface of the sintered body 11, thus leaving the air gap 20 between the tip 143 of the second terminal portion 142 and the sintered body 11. In other words, at least the tip 143 of the second terminal portion 142 and the sintered body 11 are separate from each other. In this case, the stress caused by the shrinkage during the baking process has already been removed by letting the tip 143 of the second terminal portion 142 peel off the surface of the sintered body 11. This reduces, even if a heat cycle is applied while the multilayer varistor 1 is being used, the chances of the second terminal portion 142 further peeling off the sintered body 11.

Also, plating the primary electrode layer 14 with the air gap 20 still left between the tip 143 of the second terminal portion 142 and the sintered body 11 allows the plating electrode 15 to enter the air gap 20 between the primary electrode layer 14 and the sintered body 11 while the primary electrode layer 14 is being coated with the plating electrode 15. That is to say, an interposed portion 16 is formed by allowing a part of the plating layer (i.e., the electrode paste that forms the plating electrode 15) to enter a region (i.e., the air gap 20) where the tip 143 of the second terminal portion 142 and the sintered body 11 are separate from each other. In this embodiment, the interposed portion 16 is provided in each of the regions (air gaps 20) where the respective tips 143 of the pair of terminals (of the second terminal portion 142) and the sintered body 11 are separate from each other. The interposed portion 16 is present between the tip 143 of the second terminal portion 142 and the sintered body 11 to cover the surface of the tip 143 of the second terminal portion 142. Thus, when the tip of the side surface electrode 12 is viewed from the right-hand side of the sintered body 11, for example, the plating electrode 15 (more specifically, the interposed portion 16 that forms part of the plating electrode 15 that has entered the air gap 20) is interposed between the primary electrode layer 14 and the sintered body 11. Consequently, the respective tips 143 of the second terminal portion 142 of the primary electrode layer 14 provided for the upper and lower surfaces of the sintered body 11 are coated with the plating electrode 15. Making the silver contained in the primary electrode layer 14 exposed at the tips 143 of the second terminal portion 142 would increase the chances of causing migration. In contrast, according to this configuration, the respective tips 143 of the second terminal portion 142, where migration is most likely to occur, are coated with the plating electrode 15 (interposed portion 16). Thus, this plating electrode 15 (interposed portion 16) reduces the chances of causing migration.

In the known art, applying a silver paste (electrode paste), containing a glass frit, onto the sintered body 11 and baking the silver paste causes the glass to be melted and then solidified, thus bonding the primary electrode layer 14 and the sintered body 11 together. In that case, however, a residual stress will be caused in the primary electrode layer 14 due to a difference in shrinkage rate between the primary electrode layer 14 and the sintered body 11. Forming the plating electrode 15 on the primary electrode layer 14 would further increase the residual stress. Thus, when subjected to a thermal stress such as a heat cycle, the tip of the primary electrode layer 14 (specifically, the tip 143 of the second terminal portion 142) would peel off the sintered body 11, thus exposing the silver at the shortest distance tip with a different potential (i.e., the tip 143 of the second terminal portion 142) and thereby increasing the chances of causing migration. In contrast, according to this embodiment, separating the primary electrode layer 14 from the sintered body 11 at the tip of the primary electrode layer 14 (i.e., at the tip 143 of the second terminal portion 142) to leave the air gap 20 between the primary electrode layer 14 and the sintered body 11 reduces the residual stress to be caused while the primary electrode layer 14 is being baked. In addition, letting the plating electrode 15 (i.e., the interposed portion 16 that forms part of the plating electrode 15) enter the air gap 20 when forming the plating electrode 15 on the primary electrode layer 14 allows the silver at the tip 143 of the primary electrode layer 14 to be covered. Consequently, this enables preventing the primary electrode layer 14 from being exposed at the shortest distance tip with a different potential (i.e., at the tip 143 of the second terminal portion 142) and thereby reducing the chances of causing migration. Furthermore, the multilayer varistor 1 according to this embodiment has a stress relieving structure, thus reducing the chances of the primary electrode layer 14 further peeling off the sintered body 11 and thereby reducing the chances of causing migration even when the multilayer varistor 1 is subjected to a thermal stress such as a heat cycle.

In this embodiment, when measured in the second direction, the length L2 of the region (i.e., the air gap 20) where the tip 143 of the second terminal portion 142 and the sintered body 11 are separate from each other is preferably equal to or greater than 3% and equal to or less than 20% of the length L1 of the second terminal portion 142 (refer to FIG. 2). More preferably, the length (i.e., the length L2) of the air gap 20 after the primary electrode layer 14 has been baked is preferably equal to or greater than 5% and equal to or less than 10% of the distance from the side surface to the tip (i.e., the length L1). The reason is that if the length of the air gap 20 were less than 5% of the length L1, then the residual stress caused at the time of sintering would not be reduced sufficiently. On the other hand, if the length of the air gap 20 were greater than 10% of the length L1, then it would be difficult to ensure sufficient shape stability for the plated structure.

Furthermore, when measured in the second direction, the length L3 of the interposed portion 16 is preferably equal to or greater than 2% and equal to or less than 8% of the length L1 of the second terminal portion 142 (refer to FIG. 2). More preferably, the length L3 is equal to or greater than 4% and equal to or less than 6% of the length L1. The reason is that if the length L3 of the interposed portion 16 were less than 2% of the length L1 of the second terminal portion 142, then the silver contained in the second terminal portion 142 and exposed in the air gap 20 could not be covered sufficiently. On the other hand, if the length L3 of the interposed portion 16 were greater than 8% of the length L1 of the second terminal portion 142, then the distance between the side surface electrodes 12 would be too short to significantly reduce the chances of causing migration.

Furthermore, the average thickness of the primary electrode layer 14 is preferably equal to or greater than 1 μm and equal to or less than 6 μm. Also, the primary electrode layer 14 subjected to the baking process more preferably has an average thickness equal to or greater than 2 μm and equal to or less than 4 μm. The reason is that if the average thickness of the primary electrode layer 14 subjected to the baking process were less than 2 μm, then the primary electrode layer 14 would be discontinuous and could not be electrically connected to the internal electrodes 13. On the other hand, if the average thickness of the primary electrode layer 14 subjected to the baking process were greater than 4 μm, then the content of the glass contributing to producing fixing strength between the sintered body 11 and the second terminal portion 142 of the primary electrode layer 14 would increase so much as to bond the primary electrode layer 14 and the sintered body 11 together too tight to leave the air gap 20 between the primary electrode layer 14 and the sintered body 11.

The multilayer varistor 1 having such a configuration may be mounted on, for example, a board provided with a balanced line, to which a communications IC is connected. The multilayer varistor 1 is mounted onto the board with either the first principal surface S31 or the second principal surface S32 thereof used as a mount surface. In that case, the first external electrodes 12a are connected to the ground of the circuit and the second external electrodes 12b and the third external electrodes 12c are respectively connected to signal lines of the balanced line. In this case, superposing static electricity on the signal lines of the balanced line and applying a voltage higher than a predetermined threshold voltage to (either the first varistor or the second varistor of) the multilayer varistor 1 causes a steep decrease in the electrical resistance of the multilayer varistor 1 and allows a current to flow through the multilayer varistor 1, thus enabling protecting the circuit provided with the multilayer varistor 1.

The multilayer varistor 1 according to this embodiment includes the first varistor and the second varistor. Each of the first varistor and the second varistor preferably has a capacitance equal to or less than 200 pF. The difference in capacitance between the first varistor and the second varistor is preferably equal to or greater than −20% and equal to or less than +20% of the capacitance of the first varistor. This reduces crosstalk when the multilayer varistor 1 is connected to a communication IC, for example, thus improving the quality of communication.

Next, a method for manufacturing the multilayer varistor 1 according to this embodiment will be described.

The multilayer varistor 1 according to this embodiment contains ZnO as a main component thereof and either $Bi_2O_3$, $Co_2O_3$, $MnO_2$, $Sb_2O_3$, or any other suitable compound or $Pr_6O_{11}$, $Co_2O_3$, $CaCO_3$, $Cr_2O_3$ or any other suitable compound as a sub-component thereof. The sintered body 11 may be formed by causing ZnO to be sintered and causing other sub-components to deposit on the grain boundary thereof. In this sintered body 11, the internal electrodes 13 are formed between the multiple varistor layers stacked.

To form the sintered body 11 by firing process, first, a powder containing ZnO as a main component and either $Bi_2O_3$, $Co_2O_3$, $MnO_2$, $Sb_2O_3$, or any other suitable compound or $Pr_6O_{11}$, $Co_2O_3$, $CaCO_3$, $Cr_2O_3$ or any other suitable compound as a sub-component is provided. Next, a slurry is prepared by adding a solvent, a plasticizer, or other suitable additives to the powder. Then, the slurry of the ceramic is formed into a sheet shape. Thereafter, an electrode in an arbitrary shape, which will be the internal electrode 13, is formed by screen printing process. The electrode is preferably made of Pd but may also be made of Ag. Subsequently, the ceramic sheet on which the electrode has been printed and another ceramic sheet on which no electrode is printed are stacked one on top of another to make a multilayer stack of ceramics. Then, the multilayer stack of ceramics is cut off into an arbitrary shape to obtain green chips. Finally, the green chips are fired to form ceramic elements (sintered bodies 11) having a varistor characteristic. If these ceramic elements (sintered bodies 11) are used as components, then external electrodes to be electrically conductive with the internal electrodes are required.

In the known art, to form the side surface electrodes 12, a material for the side surface electrodes 12 is applied by pressing an electrode paste, containing, as a main component, silver adhered to a relief, against the ceramic element (sintered body 11) and then baked to form a primary electrode layer. This process allows the primary electrode layer to be formed to a thickness greater than 10 μm but does not allow the primary electrode layer to be thin. In contrast, according to the present disclosure, a groove printing process is adopted in which the sintered body 11 is pushed into an intaglio filled with an electrode paste, containing not only silver as a main component but also 3-4 wt % of glass, to cause the electrode paste to creep up and be applied onto the ceramic element (sintered body 11). Next, the electrode paste thus applied to the ceramic element is baked, thereby forming a primary electrode layer 14. In this manner, the primary electrode layer 14 may be formed to have a small thickness equal to or greater than 1 μm and equal to or less than 6 μm. This allows the air gap 20 to be left with good stability at the tip 143 of the second terminal portion 142 of the primary electrode layer 14 due to the shrinkage of the ceramic element during the baking process. Consequently, the interposed portion 16 may be formed between the tip 143 of the second terminal portion 142 and the sintered body 11 by filling, with reliability, the air gap 20 with the plating during the plating process that follows the baking process.

VARIATIONS

Note that the embodiment described above is only an exemplary one of various embodiments of the present disclosure and should not be construed as limiting. Rather, the exemplary embodiment may be readily modified in various manners depending on a design choice or any other factor without departing from the scope of the present disclosure. Next, variations of the exemplary embodiment will be enumerated one after another. Note that the variations to be described below may be adopted in combination as appropriate.

First Variation

In the exemplary embodiment described above, the first to third external electrodes 12a-12c are provided for the longer side surfaces of the sintered body 11. However, such an arrangement of the first to third external electrodes 12a-12c is only an example and should not be construed as limiting.

Alternatively, a multilayer varistor 1 with the ability to reduce the chances of causing migration may also be provided even by providing the first external electrodes 12a for the longer side surfaces of the sintered body 11 and the second and third external electrodes for the shorter end surfaces of the sintered body 11.

Figure 5:
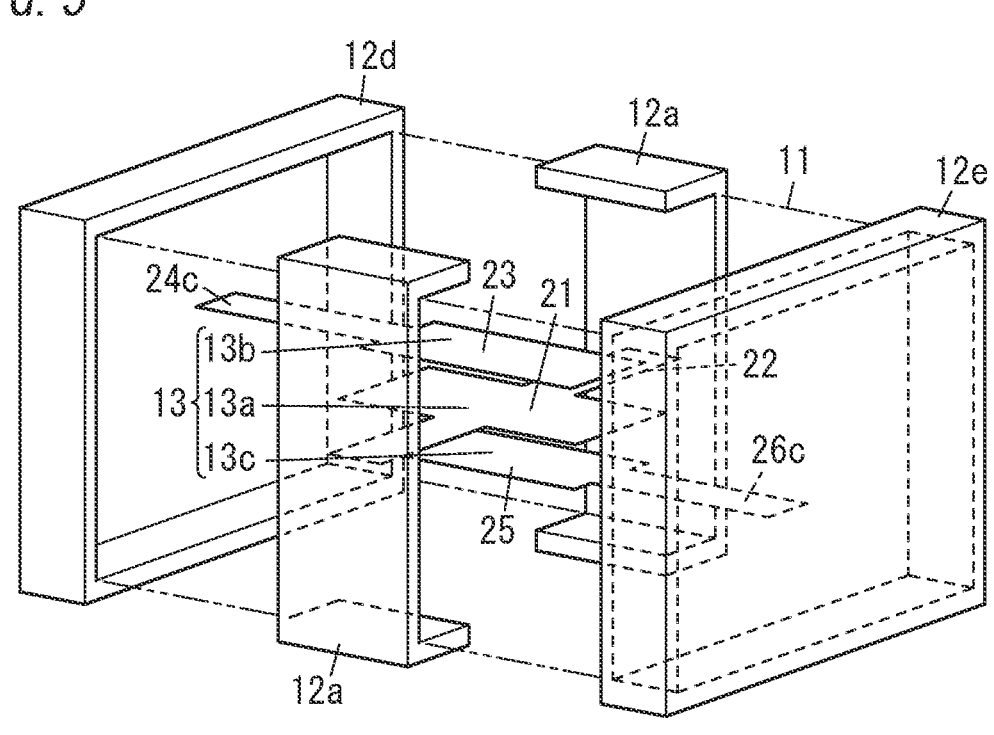
FIG. 5 is a see-through perspective view of a multilayer ceramic component according to a first variation.
Figure 5:
Figure 6:
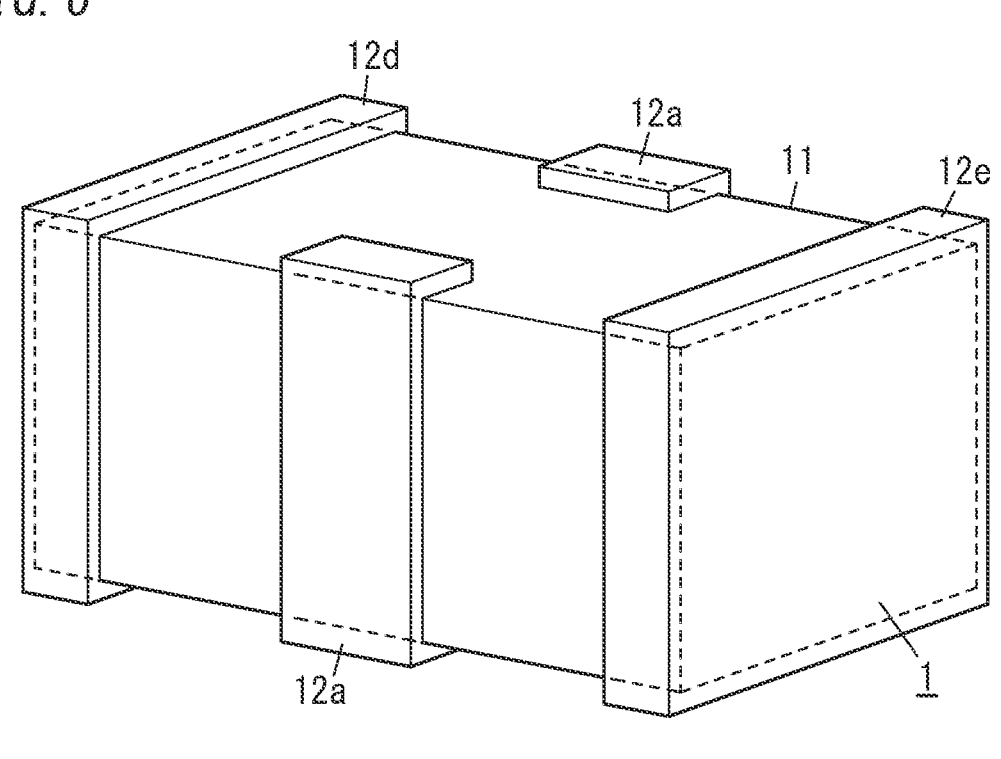
FIG. 6 is a perspective view illustrating the appearance of the multilayer ceramic component according to the first variation.
Figure 6:

FIG. 5 is a see-through perspective view of a multilayer varistor 1 according to a first variation. FIG. 6 is a perspective view illustrating the appearance of the multilayer varistor 1 according to the first variation.

In the multilayer varistor 1 according to the first variation, a second external electrode 12d is provided for the left end surface (second end surface S12) of the sintered body 11 and a third external electrode 12e is provided for the right end surface (first end surface S11) of the sintered body 11. That is to say, the multilayer varistor 1 includes the second external electrode 12d and the third external electrode 12e as a pair of end surface electrodes respectively provided for the pair of end surfaces (namely, the second end surface S12 and the first end surface S11).

The second external electrode 12d is provided for the entire second end surface S12 as the left end surface to cover not only the second end surface S12 in its entirety but also respective parts (i.e., left end portions of) the first side surface S21 and the second side surface S22 and respective parts (i.e., left end portions of) the first principal surface S31 and the second principal surface S32.

On the other hand, the third external electrode 12e is provided for the entire first end surface S11 as the right end surface to cover not only the first end surface S11 in its entirety but also respective parts (i.e., right end portions of) the first side surface S21 and the second side surface S22 and respective parts (i.e., right end portions of) the first principal surface S31 and the second principal surface S32.

In addition, the multilayer varistor 1 further includes, as the internal electrodes 13: a first internal electrode 13a electrically connected to the first external electrode 12a; a second internal electrode 13d electrically connected to the second external electrode 12d; and a third internal electrode 13e electrically connected to the third external electrode 12e. That is to say, the multilayer varistor 1 includes the second internal electrode 13d and the third internal electrode 13e as a pair of internal electrodes which are electrically connected to the pair of end surface electrodes (namely, the second external electrode 12d and the third external electrode 12e), respectively.

The first internal electrode 13a has the same configuration as the first internal electrode 13a of the multilayer varistor 1 shown in FIG. 1, and therefore, description thereof will be omitted herein.

The second internal electrode 13d includes a second facing portion 23 and a second extended portion 24c. The second facing portion 23 faces, in the third direction, the first facing portion 21. The second extended portion 24c protrudes to the left, for example, in the first direction from the second facing portion 23 to be connected to the second external electrode 12d provided for the second end surface S12.

The third internal electrode 13e includes a third facing portion 25 and a third extended portion 26c. The third facing portion 25 faces, in the third direction, the first facing portion 21. The third extended portion 26c protrudes to the right, for example, in the first direction from the third facing portion 25 to be connected to the third external electrode 12e provided for the first end surface S11.

In the multilayer varistor 1 according to the first variation, the second external electrode 12d and the third external electrode 12e are formed by dip coating process in which the end surfaces of the sintered body 11 are dipped in an electrode paste. This makes the average thicknesses of the second external electrode 12d and the third external electrode 12e greater than the average thickness of the first external electrodes 12a, thus making the primary electrode layer 14 peelable less easily from the sintered body 11 in the second external electrode 12d and the third external electrode 12e. Therefore, in the second external electrode 12d and the third external electrode 12e, no air gap is left between the tip of the second terminal portion 142 of the primary electrode layer 14 and the sintered body 11 and no interposed portion 16 is formed there, either.

On the other hand, the first external electrodes 12a serving as the side surface electrodes 12 are formed on the side surfaces (namely, the first side surface S21 and the second side surface S22) of the sintered body 11 by, for example, transferring the electrode paste that fills the grooves as in the exemplary embodiment described above. This allows the primary electrode layer 14 formed on the surface of the sintered body 11 to have a smaller thickness than in a situation where the first external electrode 12a is formed by transferring the electrode paste applied on a relief onto the side surfaces of the sintered body 11. Therefore, an air gap 20 is left, due to a thermal stress applied during the sintering process, between the tip 143 of the second terminal portion 142 and the sintered body 11 and the plating layer is allowed to enter the air gap 20, thereby forming the interposed portion 16 between the tip 143 of the second terminal portion 142 and the sintered body 11. That is to say, in the multilayer varistor 1 according to this first variation, the interposed portion 16 is formed in a region where the tip 143 of the second terminal portion 142 included in each of the first external electrodes 12a serving as the side surface electrodes 12 and the sintered body 11 are separate from each other.

As can be seen, during a cooling process after the sintering process, thermal stress is applied to the primary electrode layer 14 to cause the tip 143 of the second terminal portion 142 to peel off the sintered body 11, thus removing the thermal stress applied to the primary electrode layer 14. This reduces the chances of the primary electrode layer 14 further peeling off the sintered body 11 due to a heat cycle applied while the multilayer varistor 1 is being used. In addition, the interposed portion 16 is formed by allowing the plating layer to enter the air gap 20 left between the tip 143 of the second terminal portion 142 and the sintered body 11. This allows the silver contained in the primary electrode layer 14 to be covered with the interposed portion 16 at the tip 143 of the second terminal portion 142, thus reducing the chances of causing migration.

Other Variations

In the exemplary embodiment and first variation described above, the multilayer ceramic component is supposed to be a multilayer varistor 1. However, the multilayer ceramic component does not have to be the multilayer varistor 1. Rather, the multilayer ceramic component only needs to have a multilayer structure in which multiple layers, each containing a ceramic component, are stacked one on top of another, and may also be, for example, a thermistor or a capacitor.

In the exemplary embodiment and first variation described above, only one second internal electrode 13b is provided. Alternatively, multiple second internal electrodes 13b may be provided. If the multilayer varistor 1 includes a plurality of second internal electrodes 13b, then one or more first internal electrodes 13a are preferably interposed between each pair of adjacent second internal electrodes 13b.

Also, in the exemplary embodiment and the first variation, only one third internal electrode 13c is provided. Alternatively, multiple third internal electrodes 13c may be provided. If the multilayer varistor 1 includes a plurality of third internal electrodes 13c, then one or more first internal electrodes 13a are preferably interposed between each pair of adjacent third internal electrodes 13c.

Furthermore, in the multilayer varistor 1 according to the exemplary embodiment described above, each of the first side surface S21 and the second side surface S22 is provided with the first external electrode 12a, the second external electrode 12b, and the third external electrode 12c. However, this is only an example and should not be construed as limiting. Alternatively, the first external electrode 12a, the second external electrode 12b, and the third external electrode 12c may be provided for at least one of the first side surface S21 or the second side surface S22. That is to say, the first external electrode 12a, the second external electrode 12b, and the third external electrode 12c may be provided for only the first side surface S21 or only the second side surface S22.

Recapitulation

As can be seen from the foregoing description, a multilayer ceramic component (1) according to a first aspect includes a sintered body (11), a plurality of internal electrodes (13), and a side surface electrode (12). The sintered body (11) has a pair of end surfaces (S11, S12) facing each other in a first direction, a pair of side surfaces (S21, S22) facing each other in a second direction, and a pair of principal surfaces (S31, S32) facing each other in a third direction. The sintered body (11) has a shape of a rectangular parallelepiped, of which the longitudinal axis is aligned with the first direction. The plurality of internal electrodes (13) are arranged inside the sintered body (11). The side surface electrode (12) is provided for at least one side surface (S21, S22) out of the pair of side surfaces (S21, S22) of the sintered body (11) and electrically connected to at least one of the plurality of internal electrodes (13). The side surface electrode (12) includes: a primary electrode layer (14) containing silver as a main component thereof; and a plating layer (15) formed to cover the primary electrode layer (14) at least partially. The primary electrode layer (14) includes a first terminal portion (141) and a second terminal portion (142). The first terminal portion (141) is provided for the at least one side surface (S21, S22) of the sintered body (11). The second terminal portion (142) extends, in the second direction, from at least one of a pair of end portions of the first terminal portion (141) in the third direction and is provided for at least one of the pair of principal surfaces (S31, S32). A tip (143) of the second terminal portion (142) and the sintered body (11) are separate from each other in a region. The multilayer ceramic component (1) further includes an interposed portion (16) as a part of the plating layer (15) that has entered the region where the tip (143) of the second terminal portion (142) and the sintered body (11) are separate from each other.

This aspect may provide a multilayer ceramic component (1) that reduces the chances of causing migration.

In a multilayer ceramic component (1) according to a second aspect, which may be implemented in conjunction with the first aspect, the second terminal portion (142) includes a pair of terminals respectively extending in the second direction from the pair of end portions of the first terminal portion (141) in the third direction. The interposed portion (16) is present in a region where a tip (143) of each of the pair of terminals and the sintered body (11) are separate from each other.

This aspect allows the multilayer ceramic component (1) to be mounted onto a board, no matter which of the pair of principal surfaces thereof is used as a mount surface.

In a multilayer ceramic component (1) according to a third aspect, which may be implemented in conjunction with the first or second aspect, when measured in the second direction, a length (L2) of the region where the tip (143) of the second terminal portion (142) and the sintered body (11) are separate from each other is equal to or greater than 3% and equal to or less than 20% of a length (L1) of the second terminal portion (142).

This aspect may sufficiently reduce the residual stress at the time of sintering process. In addition, this aspect may also reduce the chances of the silver being exposed at the tip (143) of the second terminal portion (142).

In a multilayer ceramic component (1) according to a fourth aspect, which may be implemented in conjunction with any one of the first to third aspects, when measured in the second direction, a length (L3) of the interposed portion (16) is equal to or greater than 2% and equal to or less than 8% of a length (L1) of the second terminal portion (142).

This aspect may reduce the chances of causing migration.

In a multilayer ceramic component (1) according to a fifth aspect, which may be implemented in conjunction with any one of the first to fourth aspects, the primary electrode layer

(14) has an average thickness equal to or greater than 1 μm and equal to or less than 6 μm.

This aspect may reduce the chances of the primary electrode layer (14) being formed discontinuously and thereby reduce the chances of electrical connection between the primary electrode layer (14) and the internal electrode (13) losing stability by setting the average thickness of the primary electrode layer (14) at a value equal to or greater than 1 μm. In addition, this aspect may also reduce the chances of increasing the bond strength between the sintered body (11) and the second terminal portion (142) too much and thereby make it easier to leave an air gap (20) between the tip (143) of the second terminal portion 142 and the sintered body (11) by setting the average thickness of the primary electrode layer (14) at a value equal to or less than 6 μm.

In a multilayer ceramic component (1) according to a sixth aspect, which may be implemented in conjunction with any one of the first to fifth aspects, a material for the plating layer (15) contains at least one of nickel or tin.

A multilayer ceramic component (1) according to a seventh aspect, which may be implemented in conjunction with any one of the first to sixth aspects, further includes a pair of end surface electrodes (12d, 12e) provided for the pair of end surfaces (S11, S12), respectively. The plurality of internal electrodes (13) includes a pair of internal electrodes (13d, 13e) for the end surface electrodes (12d, 12e). The pair of internal electrodes (13d, 13e) are electrically connected to the pair of end surface electrodes (12d, 12e), respectively. The interposed portion (16) is present in the region where the tip (143) of the second terminal portion (142) of the side surface electrode (12) and the sintered body (11) are separate from each other.

This aspect may provide a multilayer ceramic component (1) that reduces the chances of causing migration.

Note that the constituent elements according to the second to seventh aspects are not essential constituent elements for the multilayer ceramic component (1) but may be omitted as appropriate.

The present disclosure provides a multilayer varistor that reduces the chances of causing migration even when the distance between the external electrodes is shortened. Thus, the multilayer varistor according to the present disclosure is broadly applicable on an industrial basis.

REFERENCE SIGNS LIST

1 Multilayer Varistor (Multilayer Ceramic Component)
11 Sintered Body
12 Side Surface Electrode
12a First External Electrode
12b Second External Electrode
12c Third External Electrode
12d Second External Electrode (End Surface Electrode)
12e Third External Electrode (End Surface Electrode)
13 Internal Electrode
13a First Internal Electrode
13b Second Internal Electrode
13c Third Internal Electrode
13d Second Internal Electrode (Internal Electrode for End Surface Electrode)
13e Third Internal Electrode (Internal Electrode for End Surface Electrode)
14 Primary Electrode Layer
15 Plating Electrode (Plating Layer)
15a Primary Plating Electrode
15b Secondary Plating Electrode 15                                                        16

16 Interposed Portion
141 First Terminal Portion
142 Second Terminal Portion
143 Tip
S11 First End Surface (End Surface)
S12 Second End Surface (End Surface)
S21 First Side Surface (Side Surface)
S22 Second Side Surface (Side Surface)
S31 First Principal Surface (Principal Surface)
S32 Second Principal Surface (Principal Surface)

The invention claimed is:

1. A multilayer ceramic component comprising:
a sintered body having a pair of end surfaces facing each other in a first direction, a pair of side surfaces facing each other in a second direction, and a pair of principal surfaces facing each other in a third direction, the sintered body having a shape of a rectangular parallelepiped, a longitudinal axis of the rectangular parallelepiped being aligned with the first direction;
a plurality of internal electrodes arranged inside the sintered body; and
a side surface electrode provided for at least one side surface out of the pair of side surfaces of the sintered body and electrically connected to at least one of the plurality of internal electrodes,
the side surface electrode including: a primary electrode layer containing silver as a main component thereof; and a plating layer formed to cover the primary electrode layer at least partially,
the primary electrode layer including: a first terminal portion provided for the at least one side surface of the sintered body; and a second terminal portion extending, in the second direction, from at least one of a pair of end portions of the first terminal portion in the third direction and provided for at least one of the pair of principal surfaces,
a tip of the second terminal portion and the sintered body being separate from each other in a region,
the multilayer ceramic component further comprising an interposed portion as a part of the plating layer that has entered the region where the tip of the second terminal portion and the sintered body are separate from each other,
wherein when measured in the second direction, a length of the region where the tip of the second terminal portion and the sintered body are separate from each other is equal to or greater than 3% and equal to or less than 20% of a length of the second terminal portion.

2. The multilayer ceramic component of claim 1, wherein when measured in the second direction, a length of the interposed portion is equal to or greater than 2% and equal to or less than 8% of a length of the second terminal portion.

3. The multilayer ceramic component of claim 1, wherein the primary electrode layer has an average thickness equal to or greater than 1 μm and equal to or less than 6 μm.

4. The multilayer ceramic component of claim 1, wherein a material for the plating layer contains at least one of nickel or tin.

5. The multilayer ceramic component of claim 1, further comprising a pair of end surface electrodes provided for the pair of end surfaces, respectively, wherein
the plurality of internal electrodes includes a pair of internal electrodes for the end surface electrodes, the pair of internal electrodes being electrically connected to the pair of end surface electrodes, respectively, and the interposed portion is present in the region where the tip of the second terminal portion of the side surface electrode and the sintered body are separate from each other.

6. A multilayer ceramic component comprising:
a sintered body having a pair of end surfaces facing each other in a first direction, a pair of side surfaces facing each other in a second direction, and a pair of principal surfaces facing each other in a third direction, the sintered body having a shape of a rectangular parallelepiped, a longitudinal axis of the rectangular parallelepiped being aligned with the first direction;
a plurality of internal electrodes arranged inside the sintered body; and
a side surface electrode provided for at least one side surface out of the pair of side surfaces of the sintered body and electrically connected to at least one of the plurality of internal electrodes,
the side surface electrode including: a primary electrode layer containing silver as a main component thereof; and a plating layer formed to cover the primary electrode layer at least partially,
the primary electrode layer including: a first terminal portion provided for the at least one side surface of the sintered body; and a second terminal portion extending, in the second direction, from at least one of a pair of end portions of the first terminal portion in the third direction and provided for at least one of the pair of principal surfaces,
a tip of the second terminal portion and the sintered body being separate from each other in a region,
the multilayer ceramic component further comprising an interposed portion as a part of the plating layer that has entered the region where the tip of the second terminal portion and the sintered body are separate from each other,
wherein when measured in the second direction, a length of the interposed portion is equal to or greater than 2% and equal to or less than 8% of a length of the second terminal portion.

7. The multilayer ceramic component of claim 6, wherein the primary electrode layer has an average thickness equal to or greater than 1 μm and equal to or less than 6 μm.

8. The multilayer ceramic component of claim 6, wherein a material for the plating layer contains at least one of nickel or tin.

9. The multilayer ceramic component of claim 6, further comprising a pair of end surface electrodes provided for the pair of end surfaces, respectively, wherein
the plurality of internal electrodes includes a pair of internal electrodes for the end surface electrodes, the pair of internal electrodes being electrically connected to the pair of end surface electrodes, respectively, and
the interposed portion is present in the region where the tip of the second terminal portion of the side surface electrode and the sintered body are separate from each other.

10. A multilayer ceramic component comprising:
a sintered body having a pair of end surfaces facing each other in a first direction, a pair of side surfaces facing each other in a second direction, and a pair of principal surfaces facing each other in a third direction, the sintered body having a shape of a rectangular parallelepiped, a longitudinal axis of the rectangular parallelepiped being aligned with the first direction;
a plurality of internal electrodes arranged inside the sintered body; and a side surface electrode provided for at least one side surface out of the pair of side surfaces of the sintered body and electrically connected to at least one of the plurality of internal electrodes, the side surface electrode including: a primary electrode layer containing silver as a main component thereof; and a plating layer formed to cover the primary electrode layer at least partially, the primary electrode layer including: a first terminal portion provided for the at least one side surface of the sintered body; and a second terminal portion extending, in the second direction, from at least one of a pair of end portions of the first terminal portion in the third direction and provided for at least one of the pair of principal surfaces, a tip of the second terminal portion and the sintered body being separate from each other in a region, the multilayer ceramic component further comprising an interposed portion as a part of the plating layer that has entered the region where the tip of the second terminal portion and the sintered body are separate from each other, wherein the second terminal portion includes a pair of terminals respectively extending in the second direction from the pair of end portions of the first terminal portion in the third direction, the interposed portion is present in a region where a tip of each of the pair of terminals and the sintered body are separate from each other, and when measured in the second direction, a length of the region where the tip of the second terminal portion and the sintered body are separate from each other is equal to or greater than 3% and equal to or less than 20% of a length of the second terminal portion.

*   *   *   *   *